March 27, 1956  D. E. YOCHEM  2,739,590
HYPODERMIC SYRINGE GAUGE
Filed Jan. 10, 1955  2 Sheets-Sheet 1

*INVENTOR.*
DONALD E. YOCHEM
BY
Corbett, Mahoney & Miller
ATTORNEYS

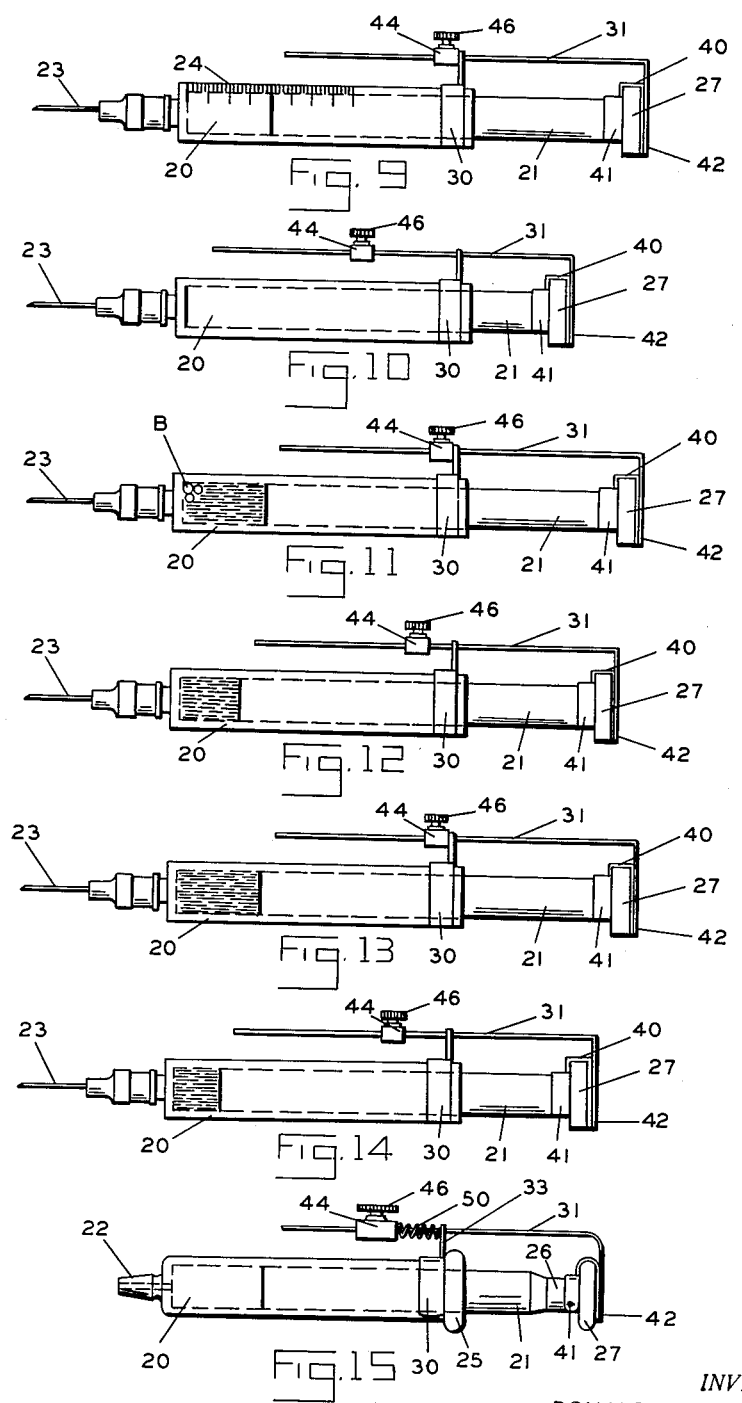

United States Patent Office 2,739,590
Patented Mar. 27, 1956

2,739,590

HYPODERMIC SYRINGE GAUGE

Donald E. Yochem, Columbus, Ohio

Application January 10, 1955, Serial No. 480,885

11 Claims. (Cl. 128—218)

My invention relates to a hypodermic syringe gauge. It has to do, more specifically, with a gauging or controlling device which can be readily attached to a hypodermic syringe and can be readily adjusted or set to determine the amount of liquid which can be drawn into the syringe so that it can later be ejected from the syringe.

The greatest usefulness for my instrument is for use by humans who have diabetes mellitus and must administer to themselves daily injections of insulin. It is very difficult or impossible for many of these patients to distinguish the small numbers and lines which indicate the unit dosage of insulin on the usual insulin syringe. The exact dose of insulin prescribed by the physician for this type of patient is very essential for proper treatment. My instrument can be set or adjusted by the physician to accurately control or gauge the prescribed dose of insulin to be drawn into and then ejected from the syringe, and is thereafter foolproof for the patient to use, thereby preventing the injection of too much or too little insulin. Thus, when my gauge is used, the patient is assured of receiving the exact dose prescribed by the physician, even though the patient has defective vision, or there is a total loss of vision, or the patient is incompetent to administer the correct dose to himself without my gauge. Furthermore, even patients with normal vision can take their insulin accurately, faster, and easier, with confidence, and without wasting insulin, when my gauge is used. Also, my gauge facilitates handling of the syringe in other ways.

In the accompanying drawings I have illustrated an example of my invention. In these drawings:

Figure 9 is a diagrammatic view showing the initial setting of the gauge member on the syringe prior to withdrawing insulin from the vial.

Figure 10 is a similar view showing the syringe after the plunger has been pushed into position to force air into the vial.

Figure 11 is a similar view showing the plunger retracted to filling position, thereby having withdrawn insulin from the vial and into the syringe barrel and having the usual air bubbles in the barrel.

Figure 12 shows the plunger pushed forwardly sufficiently to eliminate the air bubbles produced in filling the syringe.

Figure 13 shows the plunger withdrawn after the bubbles have been eliminated to pull a full dose of insulin into the syringe.

Figure 14 shows the plunger as it is being pushed forwardly during ejection.

Figure 15 is a side view of the syringe with my gauge applied thereto and showing a spring on the gauge bar which will compress upon the application of sufficient force.

Figure 1:
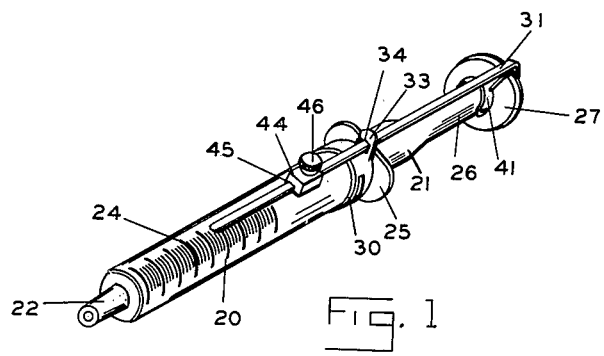
Figure 1 is an isometric view of a hypodermic syringe having my gauge applied thereto.

With reference to the drawings, in Figure 1 I have illustrated my gauge applied to an insulin syringe of a common type. This type of syringe is usually made of glass and comprises the barrel 20 and the plunger 21 mounted for reciprocation therein.

The barrel 20 is provided on its forward end with the needle stem 22 which removably receives the usual hypodermic needle 23 (Figures 9 to 14). The barrel is calibrated in the usual way, being provided with the calibrations 24 which indicate dosage or units. The rear end of the barrel is provided with the usual laterally extending flange 25.

The plunger 21 comprises a body which slidably fits into the barrel 20 and which is provided with a narrowed neck 26 at its rear end which projects from the barrel in the usual way even when the plunger is moved into its forwardmost position. On the extreme rear end of the plunger there is provided the knob or head 27. The head 27 and the narrowed neck 26 serve in the usual way to provide gripping means for retracting the plunger 21 from the barrel and the head 27 serves as pushing means for pushing the plunger into the barrel.

My gauge, which is applied to the syringe, consists of two main parts, the guide clasp 30 which is applied to the barrel 20 and the gauge bar 31 which is applied to the plunger 21 and which cooperate with each other as shown in Figure 1.

Figure 2:
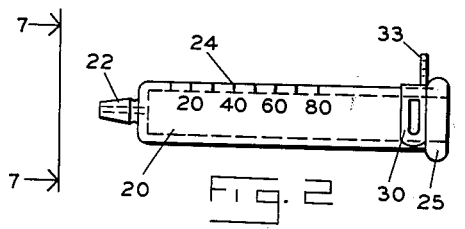
Figure 2 is a side view of the barrel of the syringe with the guide clasp of the gauge clasped thereto.

The guide clasp 30 comprises a clasping body which is of arcuate form being greater than a semi-circle and of proper size to fit tightly around the barrel 20. The guide clasp 30 will tightly embrace the barrel 20 but can be slipped axially thereof. When the guide clasp 30 is mounted on the barrel 20, as shown in Figures 1 and 2, it is moved axially rearwardly thereon until it engages the flange 25. The guide clasp 30 also includes the radially extending arm 33 which is provided with a guide opening 34, the axis of which is spaced from but parallel to the axis of the barrel 20 when the clasp is mounted thereon. One sidewall of this opening is notched or slotted at 35 to provide the depending upper lug 36 and the lower rounded corner 37. As will be understood more fully later, the slot 35 is provided for facilitating insertion or removal of the gauge bar 31 in the guide clasp 30 to thereby permit easy insertion of the plunger 21 in the barrel 20, and quick removal from the barrel for the usual cleaning and sterilization without changing the adjustment or setting of my gauge.

Figure 3:
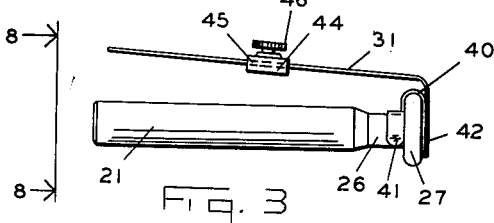
Figure 3 is a side view of the plunger of the syringe with the gauge bar of the gauge applied thereto.
Figure 4:
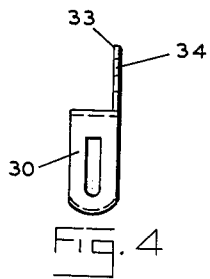
Figure 4 is an enlarged side view of the guide clasp.
Figure 5:
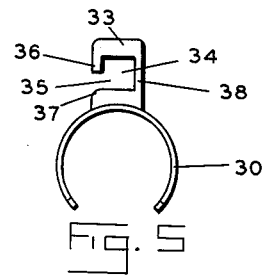
Figure 5 is an enlarged front view of the guide clasp.
Figure 6:
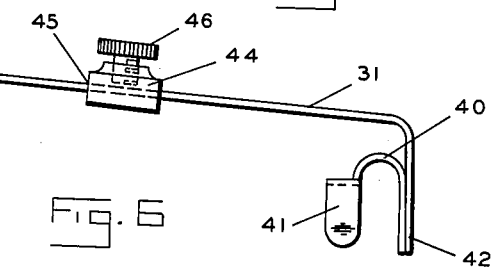
Figure 6 is an enlarged side view of the gauge bar.
Figure 7:
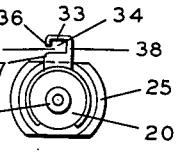
Figure 7 is an end view taken along line 7—7 of Figure 2.
Figure 8:
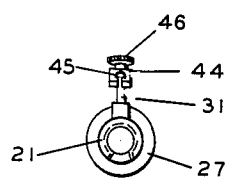
Figure 8 is an end view taken along line 8—8 of Figure 3.

The gauge bar 31 is a flat bar of suitable spring metal which is provided at its rear end with a plunger-engaging yoke 40. This yoke 40 has a spring clasp yoke portion 41 which will straddle and clasp around the neck 26 of the plunger 21, as shown in Figure 3. It is also provided with a flat disk-like portion 42 which will engage the flat rear side of the head 27 of the plunger. It will be noted that yoke 40 is connected integrally with the bar 31 and that the connection is made so that the forward end of the bar 31 will tend to swing outwardly (Figures 3 and 6) so that the bar will normally be angularly disposed relative to the axis of the plunger 21, as shown in Figure 3.

Adapted to be mounted on the gauge bar 31 ahead of the clasp arm 33, when my gauge member is assembled on the syringe, is a stop member 44 which is adjustable along the gauge bar. This stop member 44 is provided with an opening 45 through which the end of the gauge bar may be passed. A set screw 46 carried by the stop member 44 and extending into the opening 45 is used for setting the stop in any selected position along the gauge bar 31.

It will be apparent from the above description that the guide clasp 30 can be mounted on the barrel 20 merely by slipping it axially inwardly over the barrel from its forward end with a twisting action until it engages the barrel flange 25 at the rear end thereof. The gauge bar 31 is clasped to the rear end of the plunger 21 by similarly forcing the yoke structure 41 around the neck 26 while positioning the disk portion 42 in juxaposition with the outer surface of the head 27 of the plunger. Thus, at this time the guide clasp 30 will be on the barrel as shown in Figure 2 and the gauge bar 31, with the stop member 44 thereon, will be on the plunger 21 as shown in Figure 3.

The two parts of the syringe with the gauge parts thereon may now be assembled. The forward end of the plunger 21 is slipped slightly into the rear end of the barrel 20. The gauge bar 31 is positioned so that it extends forwardly beyond the arm 33 and at the side with the slot 35. Then, by pressing downwardly on the gauge bar 31 and turning the plunger 21 (clockwise as viewed from the rear end of the syringe), it can be slipped laterally through the slot 35. It will be understood that the bar 31 will swing in a slight arc and the lower corner of the slot 35 is provided with the radius 37 to prevent binding of the bar 31 during its swinging movement. When the swinging movement is stopped by the full sidewall 38 of the opening 34, the downward pressure on the bar 31 is released and it is allowed to spring out into contact with the upper edge of the opening 34, at which time it will be positioned between the lug 36 and the opposite wall 38. The gauge bar 31 now rides against the uppermost part of guide opening 34. It will be understood that the width of the bar 31 is slightly less than the width of the opening 34 and that its thickness is substantially less than the height of this opening.

As previously indicated, the provision of the slot 35 in the one sidewall of the guide opening 34 will permit quick and easy removal of the guide bar 31 therefrom, even by the patient, so as to permit removal of the plunger 21 from the barrel 20, for the usual cleaning and sterilizing, and without changing the setting or adjustment of the gauge. Ordinarily, the bar 31 will be positioned in the opening 34 between the depending lug 36 and the other wall of the opening 34. However, to remove the bar 31 from the guide clasp, it is merely necessary to press down on the bar with the index finger until it is below the lower end of the lug 36 at which time the plunger 21 is turned in the proper direction in the barrel 20 (counter-clockwise as viewed from the rear end of the syringe), so that the gauge bar 31 will swing outwardly through the slot 35. As the bar 31 swings outwardly, it again swings in an arc but the radius 37 prevents binding. The plunger 21 can now be slipped completely from the barrel 20. Reinsertion of the plunger 21 into the barrel 20 can be made as indicated above and without disturbing the setting of the stop 44 on the bar 31. Therefore, it is not necessary for the patient to return to the physician for proper re-setting of the gauge each time the plunger is removed for cleaning and sterilizing.

With the device in the condition illustrated in Figure 9, the physician treating a patient will decide how many units of insulin is required by the patient. The gauge is then set by the physician by first moving the plunger 21 in the barrel 20 until the forward end of the plunger aligns with the calibration 24 of the barrel indicating the proper dose for that particular patient. He then moves the stop 44 on the bar 31 until the rear edge of the stop contacts the forward surface of the arm 33 of the clasp 30. He then tightens the set screw 46 to hold the stop member 44 in a fixed adjusted position so that withdrawal of the plunger 21 from the barrel 20 is limited to the position set and, therefore, filling of the syringe is limited to the exact dosage prescribed. The next step is to insert the needle 23 into the rubber cap of the insulin vial, and force the plunger 21 inwardly as far as possible into the barrel 20 as shown in Figure 10. This forces substantially the same volume of air into the sealed vial as the volume of insulin to be withdrawn. This prevents a vacuum or pressure in the vial and thereby avoids suction or pressure against the plunger. Therefore, there is no tendency for the plunger to change position and alter the dose of insulin from this cause when the needle is withdrawn from the vial. Thus, withdrawal of insulin from the vial is facilitated. The plunger 21 is now withdrawn, as shown in Figure 11, until the rear edge of the stop 44 engages the forward surface of the arm 33 of the guide clasp 30. At this time a supply of insulin will have filled the barrel 20 of the syringe but the usual air bubbles B which are present in the hollow part of the needle 23 and the hollow part of the barrel stem 22 will be in the syringe barrel. To eliminate these air bubbles, the plunger 21 is pushed forward sufficiently, as shown in Figure 12, while the needle is still in the vial. Then the plunger 21 is again withdrawn as far as possible, as determined by engagement of the stop 44 with the arm 33, as shown in Figure 13, and this will provide the predetermined dose of insulin in the syring barrel as prescribed by the physician and without the air bubbles. The needle 23 is now withdrawn from the vial and inserted for injection, which is accomplished merely by pushing forward on the plunger 21, as indicated in Figure 14.

In certain cases where parenteral injections are given, it is deemed necessary to retract the plunger of a hypodermic syringe to determine whether or not the needle is in a blood vessel before injecting a medication. Therefore, when a hypodermic syringe equipped with my gauge is used for injections of this type, a small compression spring 50 is positioned on the bar 31 between the stop 44 and the arm 33 of the clasp 30, as shown in Figure 15. Normally, the rear edge of the stop 44 will engage the forward end of the spring 50 and if the rear end of the spring is in engagement with the clasp arm 33, rearward movement of the plunger will be stopped to limit the amount of liquid withdrawn into the barrel of the syringe. However, with sufficient rearward pressure on the plunger 21, after the needle is inserted into the patient, the plunger 21 can be pulled farther backwardly in the barrel 20 to a limited extent as determined by the compressibility of the spring 50. If the needle is in a blood vessel, blood will be withdrawn into the syringe, indicating that another insertion of the needle should be made. With the spring 50 in position on the bar 31, the setting of the stop member 44 on the bar to obtain the correct dosage is made in substantially the same way as previously described, except that stop 44 is merely moved on the bar 31 until it engages the forward end of the spring 50 which will be in contact with the arm 33 of the clasp 30. When making an injection with the spring 50 in position on the bar 31, the same procedure as described above, with reference to Figures 9 to 14, is followed.

It will be apparent that with this gauge member, the correct dose of insulin or other substance will be administered and this will not be dependent upon the judgment of the patient but will be dependent upon the setting of the stop 44 on the gauge bar 31 which will be set by the physician. The guide clasp 30 will cooperate with the stop member 44 to limit the amount of insulin pulled into the syringe barrel, prior to the injection, to the exact dose prescribed by the physician. The rearwardmost position of the clasp 30 on the barrel 20 is determined by the flange 25 of the barrel. This insures that the arm 33 of the clasp 30 will always be so positioned that when it is engaged by the stop 44, the bar 31 will be stopped at the proper position as the plunger 21 is withdrawn. This makes certain that the exact dose of insulin prescribed by the physician and for which the gauge is set will be taken. The upper edge of the guide hole 34 in the radially extending arm 33 of the clasp 30 is located radially beyond the outermost edge of the barrel flange 25 to allow the gauge bar 31 to function without binding on the barrel flange 25 regardless of the circumferential position of the arm 33. The clasp 30 is made of metal of sufficient springing qualities that it is adaptable to a wide range of insulin syringe barrels even though the diameter of the barrels may vary considerably. The gauge bar 31 is so constructed as to have an outward tension to cause the proper amount of friction on the upper edge of the guide hole 34. This prevents the plunger 21 from moving too freely, but permits easy operation of the plunger. Thus, it prevents the loss of insulin due to accidental forward movement of the plunger while preparing for an injection. The guide arm 33 also cooperates with stop member 44 to prevent farther backward movement of the plunger 21, thereby precluding the withdrawal of air into the syringe barrel while preparing to make the injection. Furthermore, because of the provision of the stop 44 and the guide clasp 30, it will be impossible for the plunger 21 to accidentally fall from the barrel 20 which might cause breakage of the plunger. The yoke 40 is so constructed and of metal of sufficient springing qualities that it is adaptable to the plungers of a wide range of insulin syringes. The disk-like portion 42 of the yoke 40 fits against the head of the plunger 21 in such a manner that the proper relationship between the plunger 21 and the gauge bar 31 is maintained always which, in turn, will maintain the proper relationship between the plunger and the barrel. Thus, the proper dosage is maintained in accordance with the setting of the gauge. The construction of the yoke 40 with its disk 42 is such that any strain occurring during the operation of the plunger 21 is placed on the head of the plunger. Thus, the danger of breaking the neck 26 of the plunger, which is its weakest part, is eliminated.

Because the guide opening 34 in the arm 33 is slotted at 35, the quick disassembly and reassembly of the plunger and barrel of the syringe, even by the patient, for cleaning and sterilizing is possible without disturbing the dosage setting of the stop 44 on the bar 31 which eliminates the necessity of returning to the physician for re-setting of the gauge. My gauging device is relatively simple and inexpensive to make and can be attached to or removed from the syringe with ease.

Although I have referred to my gauge member as being applied to a syringe which is especially useful for the injection of insulin, it can be used on syringes for other purposes such as immunization inoculations.

Various other advantages will be apparent from the preceding description, the drawings and the following claims.

Having thus described my invention, what I claim is:

1. In combination with a hypodermic syringe comprising a barrel and a plunger movable therein, a gauge on the syringe, said gauge comprising a guide member mounted on the barrel of the syringe and having a guide opening therein, a gauge member mounted on the plunger of the syringe and passing through the guide opening of the guide member longitudinally substantially parallel to the axis of said barrel, and a stop member on the gauge member positioned to engage the guide member adjacent said opening when the plunger is retracted relative to the barrel so as to predetermine the amount of liquid which can be pulled into the barrel of the syringe by the retracting movement of the plunger, said stop member being adjustably mounted on the gauge member to permit setting of it at different positions longitudinally of the gauge member, said guide opening having a slot in one of its walls to permit lateral movement of the gauge member through the slot into or out of said opening.

2. The combination of claim 1 in which the guide member has a portion engaging the barrel of the syringe and a radially disposed guide arm having an opening therein, and the said gauge member is in the form of a bar passing through said guide opening, said slot being of greater width than the thickness of the gauge bar to permit said bar to pass readily therethrough.

3. The combination of claim 2 in which the gauge bar has its rear end conected to the plunger and its forward end free from the plunger, spring means tending to move the free end of the bar outwardly in frictional engagement with said guide opening in the guide member, said stop member having an opening through which the bar extends, and a set screw extending into said stop member opening, said slot providing a depending lug at the upper end of the guide opening and the bar being normally located between said lug and the opposed wall of the guide opening.

4. The combination of claim 3 in which the lower end of the slot is rounded to permit lateral passage of the bar through the slot without binding when said plunger is rotated in said barrel.

5. The combination of claim 4 in which the portion of the guide member which engages the barrel includes an arcuate arm portion which yieldingly engages the barrel and contacts a flange at the rear end of the barrel to prevent further rearward movement on the barrel.

6. The combination of claim 5 in which the rear end of the gauge bar has a spring clasping portion which removably engages the head of the plunger.

7. The combination of claim 6 in which the spring clasping portion engages the neck of the plunger and has a disk-like portion that engages the rear surface of the head on the plunger.

8. The combination of claim 7 including a compression spring on the gauge bar behind the stop member so that it will be located between said stop member and said radially disposed guide arm.

9. In combination with a hypodermic syringe comprising a barrel and a plunger movable therein, a gauge on the syringe, said gauge comprising a guide member mounted on the barrel of the syringe and having a guide opening therein, said guide member having a portion engaging the barrel of the syringe and a radially disposed guide arm, a gauge member mounted on the plunger of the syringe and being in the form of a bar passing through the guide opening of the guide member longitudinally substantially parallel to the axis of said barrel, said gauge bar having its rear end connected to the plunger and its forward end free from the plunger, spring means tending to move the free end of the bar outwardly into frictional engagement with said guide opening, and a stop member on the gauge bar positioned to engage the guide arm adjacent said opening when the plunger is retracted relative to the barrel so as to predetermine the amount of liquid which can be pulled into the barrel of the syringe by the retracting movement of the plunger, said stop member having an opening through which the bar extends, and a set screw extending into said stop member opening to permit setting of said stop member at different positions longitudinally of the gauge bar.

10. The combination of claim 9 including a compression spring on the gauge bar behind the stop member so that it will be located between said stop member and said radially disposed guide arm.

11. In combination with a hypodermic syringe comprising a barrel and a plunger movable therein, a gauge on the syringe, said gauge comprising a guide member mounted on the barrel of the syringe, said guide member having a portion engaging the barrel of the syringe and a radially disposed guide arm having an opening therein, a gauge member mounted on the plunger of the syringe and being in the form of a bar passing through the guide opening of the guide member, said gauge bar having its rear end connected to the plunger and its forward end free from the plunger, spring means tending to move the free end of the bar outwardly in frictional engagement with said guide opening, and a stop member on the gauge bar positioned to engage the guide arm adjacent said opening when the plunger is retracted relative to the barrel so as to predetermine the amount of liquid which can be pulled into the barrel of the syringe by the retracting movement of the plunger, said stop member being adjustably mounted on the gauge bar to permit setting of it at different positions longitudinally of the gauge bar.

References Cited in the file of this patent

UNITED STATES PATENTS

| | | |
|---|---|---|
| 996,128 | Payne et al. | June 27, 1911 |

FOREIGN PATENTS

| | | |
|---|---|---|
| 5,541 | Switzerland | Mar. 7, 1907 |
| 182,206 | Switzerland | Apr. 16, 1936 |
| 468,435 | France | July 6, 1914 |